S. J. EDMISTON.
GUY WIRE CLAMP.
APPLICATION FILED JULY 13, 1909.
944,850.
Patented Dec. 28, 1909.
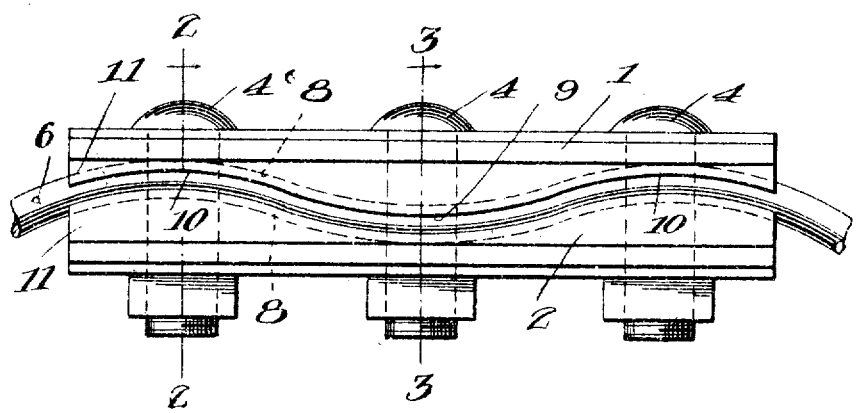
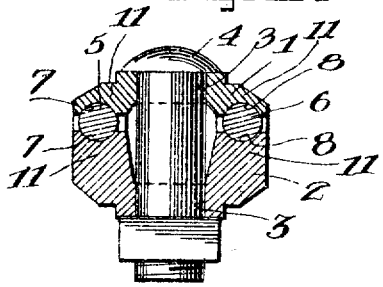 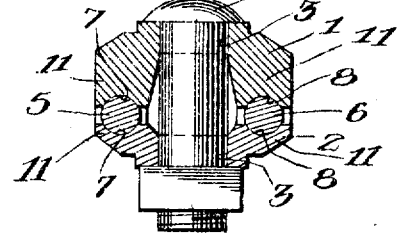
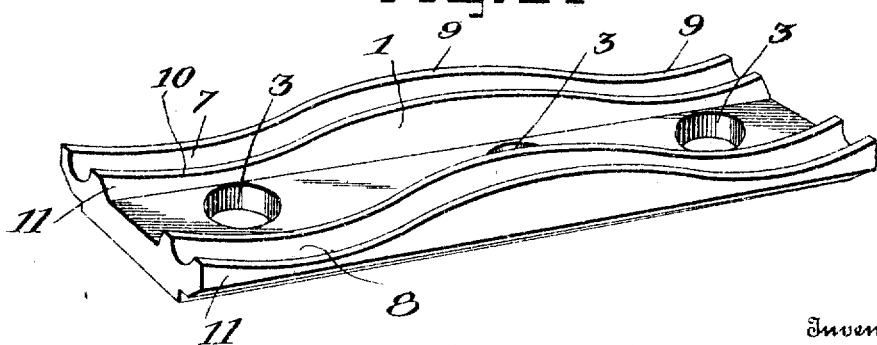
Witnesses
W. H. Rodwell
C. K. Reichenbach
Inventor
Samuel J. Edmiston
By William W. Deane
his Attorney

UNITED STATES PATENT OFFICE.

SAMUEL J. EDMISTON, OF GREENWICH, NEW YORK.

GUY-WIRE CLAMP.

944,850.  Specification of Letters Patent.  Patented Dec. 28, 1909.

Application filed July 13, 1909. Serial No. 507,442.

*To all whom it may concern:*

Be it known that I, SAMUEL J. EDMISTON, a citizen of the United States, residing at Greenwich, in the county of Washington and State of New York, have invented certain new and useful Improvements in Guy-Wire Clamps, of which the following is a specification.

My invention relates to guy wire clamps. Heretofore guy wire clamps have been made of complementary parts provided with grooves in which the guy wires are intended to lie, and suitable clamping bolts have been used to clamp the parts together. Such clamps hold the guy wires by frictional contact alone and they are not absolutely secure against slippage of the guy wires.

The object of my invention is the provision of a guy wire clamp adapted for use in connection with wires, cables, ropes, and the like, of whatever material they may be constructed, which will be composed of complementary clamp members having sinuous grooves formed and arranged in a novel manner, whereby it is practically impossible for the clamp or the guy wires to slip in any manner, thereby remedying the defect incident to the use of the ordinary guy wire clamp.

In carrying out the invention, with a desire to make the clamp as light as possible and still obtain all of the advantages incident to the novel construction of the clamp which I have devised, I provide the complementary clamp members with raised ribs or parts provided with grooves of sinuous form, comprising humps and depressions, which coöperate with the guy wires or cables held by the clamp in such a manner that slippage is impossible, great strength of the clamp is obtained and the clamp is rendered light.

The invention is set forth fully hereinafter and the novel features are recited in the appended claim.

In the accompanying drawings: Figure 1 is a side elevation of the clamp in use; Fig. 2, a cross section on line 2—2 of Fig. 1; Fig. 3, a cross section on line 3—3 of Fig. 1; and Fig. 4, a perspective detail of one of the clamp members.

The complementary clamp members 1 and 2, which are constructed of a material suitable for the purpose, are provided with bolt-holes 3 for the passage of bolts 4 to clamp them together on the cables 5 and 6.

In the old form of clamp, grooves were provided in the faces of the clamp members for the reception of the cables. The present clamp members have sinuous grooves 7 and 8 which are composed of alternated humps 9 and depressions 10. These grooves could be formed in the faces of the clamp members, but the clamp members would then have to be of relatively great thickness, adding to the weight, and I prefer to provide parallel raised parts 11 and to provide these raised parts with the said grooves, so that the clamp is trussed, as it were, and rendered very strong and yet quite light. The cables 5 and 6, conforming to the sinuous grooves, are frictionally held against any slippage thereof or slippage of the clamp, thus overcoming the defects of the old form of clamp.

Having thus described my invention, what I claim as new and desire to secure by Letters Patent, is:—

In a guy-wire clamp, the combination of a member comprising a body, and continuous, longitudinally-grooved, and spaced flanges disposed at angles to the body and having their grooved portions arranged at different distances from the body at different points in their length, a second member comprising a body, and continuous, longitudinally-grooved and spaced flanges disposed at angles to the body and having their grooved portions arranged at different distances from the body at different points in their length and also having said grooved portions shaped to mate the grooved portions of the flanges on the first-named member, and means disposed between the pairs of grooved flanges for holding the members together.

In testimony whereof I affix my signature in presence of two witnesses.

SAMUEL J. EDMISTON.

Witnesses:
T. E. BARTON,
ROBERT ELLIS.